United States Patent [19]

Siconolfi

[11] 3,713,150

[45] Jan. 23, 1973

[54] AUTOMATIC RANGE RATE MEMORY SWITCH FOR RADAR SYSTEMS

[75] Inventor: James R. Siconolfi, Fort Wayne, Ind.

[73] Assignee: The United States of America as represented by the Secretary of the Air Force

[22] Filed: Aug. 5, 1959

[21] Appl. No.: 831,922

[52] U.S. Cl. .................................... 343/7.3, 343/7.4
[51] Int. Cl. .................................................. G01s 9/02
[58] Field of Search .................................. 343/7.3, 7.4

Primary Examiner—Carl D. Quarforth
Assistant Examiner—J. M. Potenza
Attorney—Wade Koontz and James S. Shannon

[57] ABSTRACT

A radar system employing automatic range tracking including means for automatically switching the range tracking loop open whenever a video signal from any source occurs immediately prior to the target signal; and to hold the loop open until the disturbing signal passes out of range. The advantage of this automatic switching is that it operates fast enough to give protection over sweep jamming signals.

5 Claims, 3 Drawing Figures

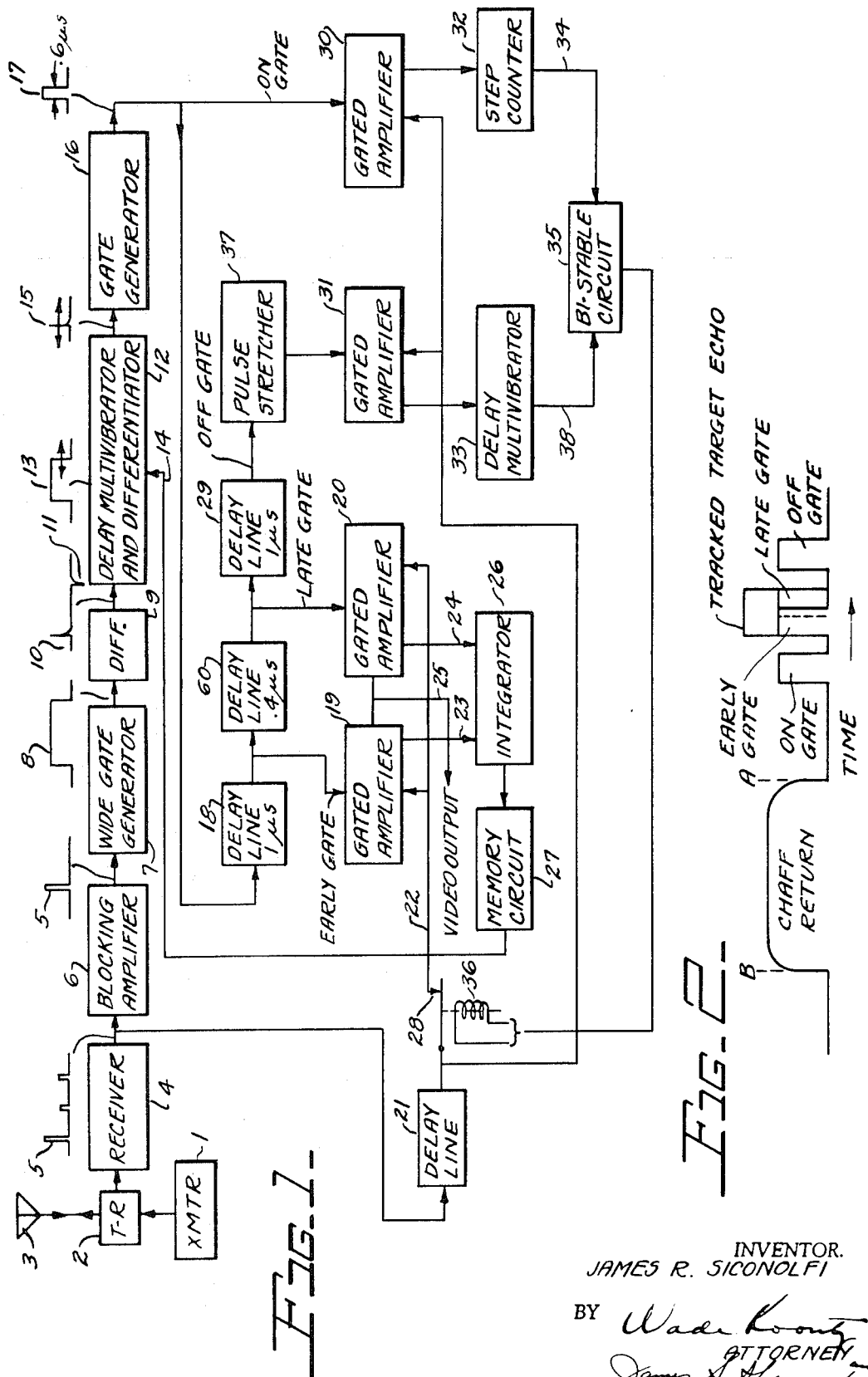

Fig. 3

AUTOMATIC RANGE RATE MEMORY SWITCH FOR RADAR SYSTEMS

In radar systems employing automatic range tracking the tracking system may become confused when a reflecting object appears in the radar beam at the range of the target. A specific example is that of the tail defense radar system of a bomber where chaff dispensed by the bomber may cause the tracking system to transfer from the target to the chaff when the latter reaches target range. Also jamming signals which sweep over the entire range at a high rate may confuse the tracking system.

In the case of chaff the usual procedure is for the operator, who can observe the chaff as well as the target on the radar presentation, to operate a manual switch removing the video signal from the tracking circuits when the chaff reaches target range and allowing the coast function of the memory circuit to continue tracking the target at its last rate until the chaff is beyond target range. Since sweep jamming signals appear almost instantaneously at all ranges, manual operation of a switch based upon observation of the radar presentation is not possible so that this procedure is not effective against sweep jamming.

The purpose of the invention is to provide means for automatically opening the range tracking loop whenever a video signal from any source occurs immediately prior to the target signal and to hold the tracking loop open until the disturbing signal passes out of range. A particular advantage of automatic switching over manual is that it operates fast enough to give protection over sweep jamming signals. Other advantages are that the radar operator is relieved of manual operation at a time when he is extremely busy, possible error in operating the manual switch is avoided and optimum use is made of the available range rate memory time.

Briefly, in accordance with the invention, two additional gates are provided in the range tracking circuits. One, designated the ON gate, precedes the early gate of the tracking system and the other, designated the OFF gate, follows the late gate of the tracking system. The circuit operates when a video signal passes the ON gate to energize a relay opening the tracking loop. This relay is held energized until a predetermined time after the last video signal has passed the OFF gate. The tracking circuit is therefore deprived of a video input and operates from its memory circuit during the time that a disturbing signal is in the vicinity of target range.

A more detailed description of the invention will be given with reference to the specific embodiment thereof shown in the accompanying drawings in which FIG. 1 is a block diagram of a range tracking circuit incorporating the invention, FIG. 2 is a diagram illustrating the relative positions of the gates used in the automatic switching of the tracking loop, and FIG. 3 is a schematic diagram of the automatic switching circuit.

Automatic range tracking systems having a range rate memory circuit, with which the invention is intended to operate, are well known in the art and a detailed discussion of their construction and operation is not necessary to an understanding of the invention. Therefore, only a brief description of an automatic tracking system will be undertaken. A complete description of a system of this type may be found, for example, in patent to Tull et al., U.S. Pat. No. 2,516,356, July 25, 1950.

Referring to FIG. 1, the radar system comprises a transmitter 1 which supplies short pulses of high frequency energy periodically through transmitreceive network 2 to directional antenna 3. These pulses, for example, may have a duration of 1 $\mu$s and a PRF (pulse repetition frequency) of 2,000/sec. Reflections from targets in the antenna beam are received by the antenna and pass through T-R network 2 to receiver 4. The video output of the receiver contains the radiated pulse 5 and smaller pulses representing reflections or echoes from targets in the antenna beam. These occur at intervals of time after the main pulse that are proportional to range.

The video output of the receiver is applied to a blocking amplifier 6 which is biased to pass the main pulse 5 but to reject the echoes on an amplitude discrimination basis. The main pulse 5 is then applied to wide gate generator 7, which it triggers to generate a gate 8 having a duration only slightly less than the interval between radiated pulses. This gate is applied to differentiating circuit 9 which produces sharp pulses 10 and 11 from its leading and trailing edges, respectively. Delay multivibrator 12 is triggered by positive pulse 10 but is insensitive to negative pulses. The wide gate 8 insures that only one positive pulse, that due to the radiated pulse, will be applied to multivibrator 12 by blocking any echo pulses that may have sufficient amplitude to get by blocking amplifier 6.

Delay multivibrator 12 is triggered by pulse 10 to produce a rectangular pulse 13 the duration of which depends upon the potential on line 14. The delay multivibrator also incorporates a differentiating element which produces a sharp positive pulse 15 from the trailing edge of pulse 13. The interval between the main radar pulse and the occurrence of pulse 15 is therefore also determined by the potential on line 14. pulse 15 triggers gate generator 16 which produces a gate 17, of, for example, 0.6 $\mu$s, the time of occurrence of this gate likewise being determined by the potential on line 14.

Gate 17 is delayed 1 $\mu$s by delay line 18 and applied to gated amplifier or coincidence circuit 19 where it is termed the early gate. After a further delay of 0.4 $\mu$s by line 60 the gate is applied to gated amplifier or coincidence circuit 20 where it is termed the late gate. The video output of receiver 4, after a delay in delay line 21, is applied in parallel to the inputs of amplifiers 19 and 20 over circuit 22. The delay line 18 is part of the invention and would not appear in a conventional system. Its function will be explained later. The delay line 21 in a conventional system should produce a delay equal to the system delay (the inherent circuit delay excluding the delay due to pulse 13) occurring between the main radar pulse and the generation of gate 17. The presence of this delay permits tracking down to minimum range. In a system incorporating the invention, the delay produced by line 21 equals the above system delay plus a delay equal to that produced by delay line 18.

When gated amplifiers 19 and 20 are opened by the early and late gates they pass whatever video signals are present on their inputs during the existence of the gates, the signal passing the early gate appearing in circuit 23 and that passing the late gate appearing in circuit 24. The sum of the video signals passed by both gates appears in circuit 25 for further use in the radar system. The early and late gates are illustrated in FIG. 2. Since these gates have a 0.2 μs overlap the total interval between the leading edge of the early gate and the trailing edge of the late gate is 1 μs and equals the durations of the radiated pulse and the target echoes. The echo of a target being tracked is also illustrated in FIG. 2. When the early and late gates have the proper tracking positions relative to the target echo, which is the case in FIG. 2, equal portions of the echo pulse pass amplifiers 19 and 20 and equal signals are produced in circuits 23 and 24. Should the early and late gates occur slightly too soon relative to the target pulse the output of amplifier 19 would decrease and should these gates occur slightly too late relative to the target pulse the output of amplifier 20 would decrease. The output signals in circuits 23 and 24 are applied to integrator 26 which in turn controls a memory circuit 27 that supplies a control voltage over circuit 14 to delay multivibrator 12 for controlling the duration of pulse 13. As previously explained, the duration of this pulse determines the interval between the main radar pulse and the occurrence of the early and late gates, or in other words, it determines the position of these gates along the range scale.

When the output signals in circuits 23 and 24 are equal, indicating that the early and late gates divide the target return equally, the integrator and memory circuit act to supply a direct control voltage to multivibrator 12 that decreases linearly with time at the rate required to maintain this condition. An error in the tracking rate or a change in rate of change of the target range will cause the early and late gates to shift relative to the target return and cause unequal output signals in circuits 23 and 24. The integrator and memory circuit respond to this inequality to change the duration of pulse 13 and also to establish a new rate of change for this pulse as required to reestablish and maintain equal signals in circuits 23 and 24. Should the video input on circuit 22 vanish for any reason the integrator and memory circuit treat this as an equal signal situation and maintain the same rate of change of the control voltage in circuit 14 that existed at the time the video signal ceased. Therefore, the early and late gates continue to track in range at their last rate and are in position to encompass and lock onto the target return when the video signal is restored.

The above situation may be instituted intentionally by manually opening a switch, such as switch 28, in the video circuit. The operator may observe when a disturbing signal, such as that due to chaff, approaches target range and hold open switch 28 until the interfering signal has passed beyond target range. The invention provides means for accomplishing this automatically and with greater precision.

In accordance with the invention, two additional gates, designated an ON gate and an OFF gate, are provided. These gates are also illustrated in FIG. 2. Added delay lines 18 and 29 cause the ON gate to start 1 μs sooner than the start of the early gate and the OFF gate to start 1 μs later than the start of the late gate. The ON gate controls gated amplifier or coincidence circuit 30 and the OFF gate controls gated amplifier or coincidence circuit 31. The video signal from the output of delay line 21 is applied to the inputs of these gated amplifiers in parallel. Any video signal present during the times that the ON and OFF gates are applied to amplifiers 30 and 31 will pass through to step counter 32 and delay multivibrator 33. The output signals of amplifiers 30 and 31, if any, are in the form of a train of pulses occurring at the PRF of the radar system. After a predetermined number of pulses, for instance three, has been received by the step counter a triggering pulse is applied by the step counter over circuit 34 to bi-stable circuit 35. Coil 36 is energized in one stable state of bi-stable circuit 35 and deenergized in the other stable state. The pulse applied over circuit 34 triggers circuit 35 from the state in which coil 36 is deenergized to that in which it is energized. Energization of coil 36 opens switch 28 and removes the video signal from the inputs to gated amplifiers 19 and 20. The counter 32 is used to eliminate the possibility of circuit 35 being triggered by a single random noise pulse.

The duration of the OFF pulse is increased somewhat by pulse stretcher 37 before application to gated amplifier 31 for reasons which will be explained later. An output from gated amplifier 31 conditions delay multivibrator 33 to produce a trigger pulse in circuit 38 at the end of a predetermined period of time after the output from amplifier 31 has ceased. Multivibrator 31 is a monostable circuit having an unstable state period of, for example, 2,000 μs and is so designed that any trigger pulse applied before the end of the period will reinitiate the running of the period. Since the output of amplifier 31 consists of pulses occurring at a rate of 2,000/sec, or one every 500 μs, the circuit 31 is not able to reach the end of its period as long as there is an output from amplifier 31. However, 2,000 μs after the output from this amplifier has ended, circuit 31 returns to its stable state and applies a pulse over circuit 38 to bi-stable circuit 35 that triggers this circuit back to its initial stable state in which coil 36 is deenergized. This action allows switch 28 to close, restoring the video signal to the inputs of gated amplifiers 19 and 20.

The operation of the automatic switching circuit in response to an interfering signal produced by chaff may be explained with reference to FIG. 2. After release, the range of the chaff return signal steadily increases. When the return from the leading edge A of the chaff reaches the ON gate, bistable circuit 35 is triggered through gated amplifier 30 and step counter 32, as explained above, opening switch 28 and removing the video input to gated amplifiers 19 and 20. The system continues to track at a rate dictated by the memory circuit 27. When the leading edge A of the chaff return reaches the OFF gate the resulting output of gated amplifier 31 triggers delay multivibrator 33 to its unstable state. Since, as explained above, the running of the 2,000 μs delay period of this circuit is reinitiated at each output pulse from amplifier 31, a trigger pulse does not appear in circuit 38 until 2,000 μs after the trailing edge B of the chaff return has passed beyond the OFF gate and output from amplifier 31 has ceased. When this occurs, circuit 35 is triggered back to its initial state and switch 28 closes restoring the video input to the tracking circuit. Any departure of the early and late gates from the equal signal position relative to the tracked target return is then corrected by the integrator and memory circuits.

The operation of the circuit for any other disturbing signal passing through the target range is the same as described above for chaff. In the case of a swept jamming signal, the trigger pulses will appear at the outputs of gated amplifiers 30 and 31 at substantially the same time. However, the output of amplifier 31 only acts to set circuit 33 so as to deliver a trigger pulse to circuit 35 in the absence of pulses from this amplifier. Therefore the trigger from counter 32 will operate circuit 35 to open switch 28 in the normal manner and 2,000 μs after the jamming signal sweeps past circuit 33 delivers a trigger pulse to circuit 35 returning the latter circuit to its initial state and deenergizing coil 36.

A schematic diagram of elements 30, 31, 32, 33, 35 and 37 of the invention, shown in block form, in FIG. 1 is presented in FIG. 3.

Gated amplifier 30 comprises a pentode 39 having the video signal applied to its control grid and the ON gate applied to its suppressor grid.

Step counter 32 comprises a triode 40b which is normally biased to cut-off by the negative potential across condenser 41 and resistor 42. The pulse output of gated amplifier 30 is rectified by diode connected section 40a to produce a positive potential across a relatively long time constant circuit consisting of condenser 43 and resistor 44. The parameters are so selected that rectification of three or four input pulses raises the potential across condenser 43 sufficiently to cause conduction in tube 40b.

An Eccles-Jordan circuit, the construction and operation of which is well known in the art, is used for the bistable circuit 35. This circuit has two conditions of stability in one of which section 45a of the dual triode 45 is conductive and section 45b is cut off and in the other of which section 45b is conductive and section 45a is cut off. Prior to an output from step counter 31, i.e., prior to the time a signal is passed by the ON gate, section 45b is conductive and section 45a is cut off. In this state coil 36 is deenergized and switch 22 is closed. If necessary, the circuit may be preset to this state by momentarily opening normally closed switch 46. After several pulses have occurred in the output of gated amplifier 30 tube 40b begins to draw current through coil 36. This lowers the anode potential of tubes 40b and 45a which lowers the grid potential of tube 45b. The resulting rise in the anode potential of 45b carries the grid of 45a upward with it toward the point of anode conduction in this tube. When this point is reached and conduction is initiated in 45a an immediate switching action occurs which ends in full conduction in 45a and zero conduction in 45b. With 45a fully conductive coil 36 is energized and switch 22 is opened.

Pulse stretcher 37 is made up of unidirectional device 47, shunted by resistor 48, and condenser 49. The OFF gate pulse immediately charges condenser 49 through the relatively low forward resistance of the diode 47. However, the condenser must discharge through resistor 48 at a slower rate which has the effect of lengthening the OFF gate applied to the suppressor grid of tube 50. This tube serves as the gated amplifier 31 of FIG. 1 and has the video signal applied to its control grid. Since the OFF gate, as derived from generator 16, has a duration of only 0.6 μs whereas the pulses constituting the video signal have durations of 1 μs, and also because of the almost continuous return from chaff, the lengthening of the OFF gate by the pulse stretcher has the effect of increasing the average output of amplifier 31. The advantage of this will be explained below.

The delay multivibrator 33 is a monostable circuit incorporating a dual triode 51 having sections 51a and 51b. The circuit has a stable state in which section 51b is conductive and 51a is cut off, the latter due to the low potential of the anode of 51b when conductive being transferred to the grid of 51a through discharge tube 52 used as a coupling device, and the relatively high potential of the cathode of 51a due to the 51b current in resistor 53. An output from gated amplifier 31 triggers circuit 33 to its unstable state in which section 51a is conductive and 51b is cut off. This transition takes place as follows: The output from gated amplifier 31 charges condenser 54 respectively. As the grid of 51b falls in potential its anode rises carrying the grid of 51a up with it and the potential of its cathode falls carrying the cathode of 51a down with it. This reduces the amount by which the grid of 51a is negative relative to its cathode and eventually results in conduction in 51a. The current of 51a flowing in resistor 53 makes the grid of 51b still more negative relative to its cathode and initiates a regenerative switching action which results in tube 51b being cut off and 51a becoming fully conductive. This state is maintained as long as condenser 54 is kept negatively charged by an output from gated amplifier 31. When the output from amplifier 31 ceases, condenser 54 discharges through resistors 55 and 53 causing the grid potential of tube 51b to rise exponentially. After an interval determined by the time constant of the circuit, conduction is restored in 51b and the circuit switches back to its stable state with 51b conductive and 51a cut off. The increased output of amplifier 31 due to pulse stretcher 37, as mentioned above, causes a greater negative potential across condenser 54 than would otherwise occur and reduces the size of resistor 55 required to give the 2,000 μs interval desired for the delay multivibrator.

The sharp fall in potential of the anode of tube 51b accompanying the end of the unstable state of circuit 33 is converted into a sharp negative pulse by differentiating circuit 56–57. This pulse is applied to the grid of conductive tube 45a of bistable circuit 35 and triggers this circuit back to its initial state in which 45a is nonconductive. This action deenergizes coil 36 and allows switch 22 to close restoring the video signal to the tracking circuit, as explained in connection with FIG. 1. Diodes 58 and 59 prevent the application of positive pulses to the grids of tubes 45a and 51b, respectively.

I claim:

1. In a radar system having means for periodically radiating pulses of high frequency energy, means for receiving reflections of said radiated pulses from targets in the field of view of the radar and converting these reflections into corresponding video signals, a tracking circuit synchronized with said radiated pulses and having said video signals as an input for producing a range gate following each radiated pulse and causing said gate to track a selected one of said video signals in range, and a memory circuit operative upon failure of said selected video signal to continue the tracking function of said range gate at its last rate, apparatus for preventing confusion of said tracking circuit by an interfering video signal passing through the range of said selected target signal, said apparatus comprising: normally inoperative means for blocking the video input to said tracking circuit, means operative following each radiated pulse for generating an ON gate preceding said tracking gate by a predetermined fixed interval and an OFF gate succeeding said tracking gate by a predetermined fixed interval, means responsive to any video signal occurring during said ON gate for rendering said video blocking means operative, and means responsive to any video signal occurring during said OFF gate and operative at the end of a predetermined interval during which no video signal occurs during said OFF gate to return said video input blocking means to its inoperative state.

2. In a radar system having means for periodically radiating pulses of high frequency energy, means for receiving reflections of said radiated pulses from targets in the field of view of the radar and converting these reflections into corresponding video signals, a tracking circuit synchronized with said radiated pulses and having said video signals as an input for producing a range gate following each radiated pulse and causing said gate to track a selected one of said video signals in range, and a memory circuit operative upon failure of said selected video signal to continue the tracking function of said range gate at its last rate, apparatus for preventing confusion of said tracking circuit by an interfering video signal passing through the range of said selected target signal, said apparatus comprising: switching means in the video input to said tracking circuit operative when open to remove said video signals from said tracking circuit, a bistable control circuit for said switching means having a first stable state in which said switching means is closed and a second stable state in which said switching means is open, means operative following each radiated pulse for generating an ON gate preceding said tracking gate by a predetermined fixed interval and an OFF gate succeeding said tracking gate by a predetermined fixed interval, first and second coincidence circuits having said video signals applied thereto in parallel, means applying said ON gate to said first coincidence circuit and said OFF gate to said second coincidence circuit whereby an output occurs from said first coincidence circuit whenever a video signal occurs during said ON gate and an output occurs from said second coincidence circuit whenever a video signal occurs during said OFF gate, means for triggering said bistable circuit from its first state to its second state in response to an output from said first coincidence circuit, a delay circuit responsive to an output from said second coincidence circuit to initiate a fixed delay interval appreciably longer than the repetition interval of said radiated pulses, and means operative at the end of said delay interval to trigger said bistable circuit from its second to its first state.

3. Apparatus as claimed in claim 2 in which said means for triggering said bistable circuit from its first state to its second state in response to an output from said first coincidence circuit comprises a step counter for delaying the triggering of said bistable circuit until a predetermined number of output pulses have occurred from said first coincidence circuit.

4. A radar system comprising means for periodically radiating pulses of high frequency energy; means for receiving reflections of said radiated pulses from targets in the field of view of the radar and converting said reflections into corresponding video signals; means synchronized with said radiated pulses for generating a rectangular delay pulse of controllable duration; means actuated by the trailing edge of said delay pulse to generate a range gate; a delay line having first, second and third cascaded sections, said first and third sections producing equal delays and said second section producing a delay less than the duration of said range gate; means for applying said range pulse to the input of said delay line; first, second, third and fourth coincidence circuits; means for delaying said video signals by an amount equal to the delay of said first line section plus the interval between a radiated pulse and the leading edge of said generated delay pulse; means for applying said delayed video signals through a video switching means to said first and second coincidence circuits; means for applying the range gate when it appears between the first and second sections of said delay line to said first coincidence circuit as an early gate; means for applying said range gate when it appears between the second and third sections of said delay line to said second coincidence circuit as a late gate; means responsive to the video outputs of said first and second coincidence circuits occurring when said early and late gates at least partially encompass a selected video signal to produce a control signal for said rectangular delay pulse generator for changing the duration of said delay pulse in accordance with the relative magnitudes of said video outputs and in such direction as to equalize said video outputs through changing the time positions of said early and late gates relative to said selected video signal, and for causing said control voltage to change at a rate proportional to the rate of change in the range of said selected video signal, said means also comprising a memory circuit operative upon failure of said selected video signal to cause said control signal to continue to change at its last rate; means for applying said delayed video signals to said third and fourth coincidence circuits; means for applying said range gate when it appears at the input to said delay line as an ON gate to said third coincidence circuit; means for applying said range gate when it appears at the output of said delay line as an OFF gate to said fourth coincidence circuit; a bistable control circuit for said video switching means, said circuit having a first stable state in which said switching means is closed and a second stable state in which said switching means is open; means responsive to a video output from said third coincidence circuit to trigger said bistable circuit from its first to its second state; and means preset by a video output from said fourth coincidence circuit for triggering said bistable circuit from its second state to its first state after a predetermined interval during which no output from said fourth coincidence circuit occurs.

5. Apparatus as claimed in claim 4 in which a step counter is connected between the output of said third coincidence circuit and said bistable circuit for delaying the triggering of said bistable circuit from its first to its second state until a predetermined number of video pulses have occurred in said third coincidence circuit output.

* * * * *